United States Patent [19]

Hayakawa

[11] Patent Number: 4,932,622
[45] Date of Patent: Jun. 12, 1990

[54] LOCKING DEVICE FOR TRIPOD LEG SECTIONS

[75] Inventor: Junichi Hayakawa, Tokyo, Japan

[73] Assignee: Velbon International Corporation, Torrance, Calif.

[21] Appl. No.: 338,296

[22] Filed: Apr. 14, 1989

[30] Foreign Application Priority Data

Apr. 21, 1988 [JP] Japan .................................. 63-53923

[51] Int. Cl.⁵ ............................................ F16M 11/26
[52] U.S. Cl. .................................. 248/188.5; 248/411
[58] Field of Search ..................... 248/411, 412, 188.5; 403/104, 108, 330, 377

[56] References Cited

U.S. PATENT DOCUMENTS

| 3,941,492 | 3/1976 | Meinunger | 248/411 X |
| 4,029,279 | 6/1977 | Nakatani | 248/188.5 |
| 4,185,936 | 1/1980 | Takahashi | 248/188.5 X |
| 4,596,484 | 1/1986 | Nakatani | 248/411 X |
| 4,725,160 | 2/1988 | Wood | 248/411 X |
| 4,761,092 | 8/1988 | Nakatani | 248/188.5 X |

Primary Examiner—Ramon S. Britts
Assistant Examiner—Daniel J. Hulseberg
Attorney, Agent, or Firm—Beehler & Pavitt

[57] ABSTRACT

A leg locking device for a telescopically extensible leg of a tripod support which prevents deformation of an inner leg section so as to provide secure, long-lasting engagement of the locking device. Each telescopically extensible leg of the tripod supports includes at least one pair of outer and inner tubular leg sections telescopically slidable one within the other, wherein each tubular leg section has a six-sided polygonal cross-section. A leg locking device associated with each telescopically extensible leg has a locking lever mounted on the outer leg section for pivotal movement transverse to the longitudinal axis of the telescopically extensible leg. In the locking position, an eccentric cam element on the locking lever engages an angled wall of the inner leg section, so as to apply a locking force diagonally across the cross-section of the inner leg section, and thus urge the diagonally opposite corner of the inner leg section into frictional engagement with the corresponding corner of the outer leg section.

15 Claims, 2 Drawing Sheets

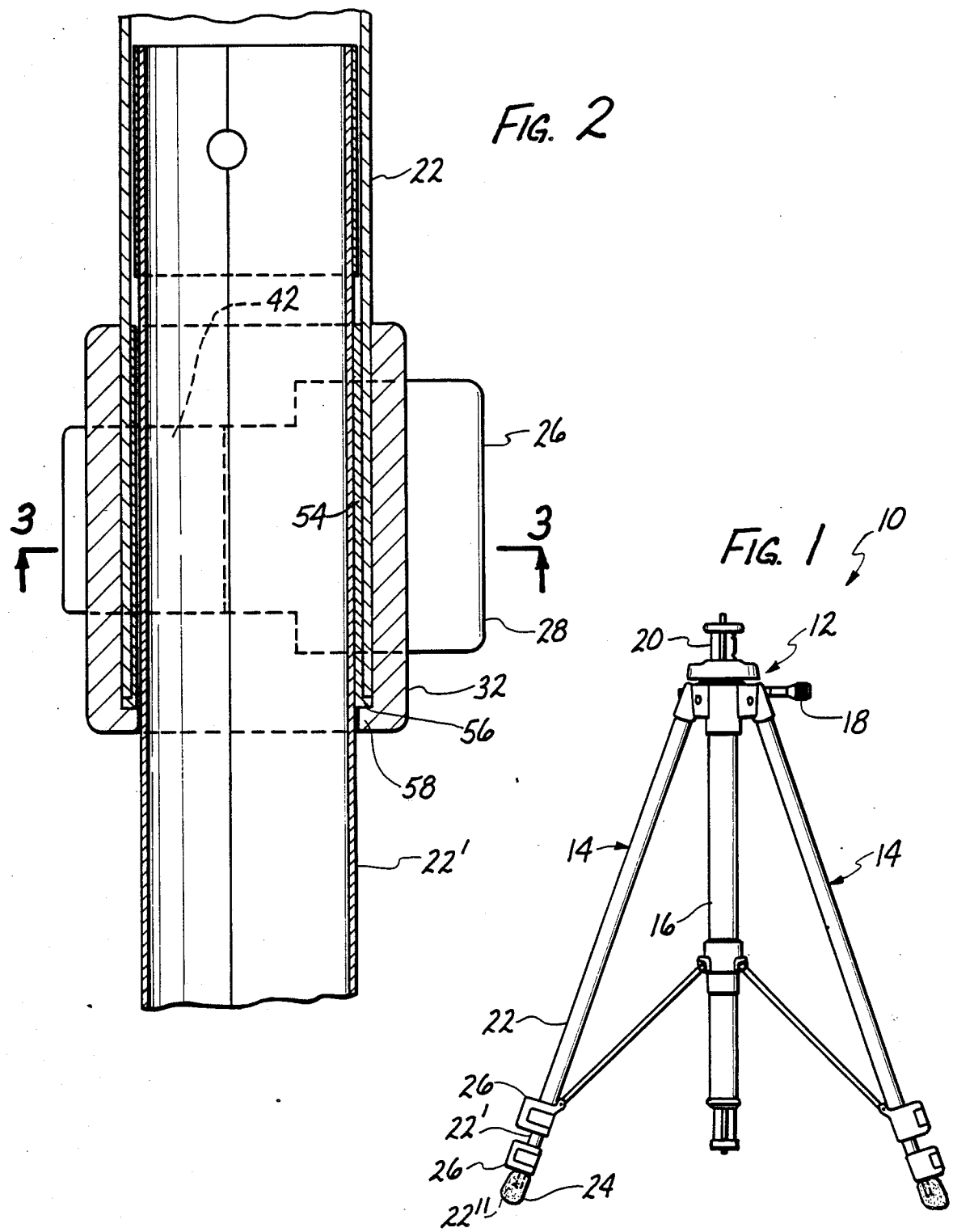

LOCKING DEVICE FOR TRIPOD LEG SECTIONS

BACKGROUND OF THE INVENTION

1. Field of the Invention

The present invention pertains generally to the field of telescopically extensible supports and in particular relates to improved leg locking devices for telescopically extensible tripod legs.

2. Description of the Prior Art

Photohgraphic tripods have long taken advantage of telescopically extensible legs for convenience and portability and also for the inherent possibility of raising the camera to different heights by extending the tripod legs to varying degrees. Further, the various legs can be adjusted in length to make up for irregularities in the ground or other underlying surface. Conventional tripod legs are made of two or more leg sections of similar cross-section but of progressively diminishing cross-sectional dimension so that the largest section can telescopically receive all subsequent, smaller leg sections. Each section except for the lowest and thinnest leg section is provided with a manual locking device for interlocking each leg section to the immediately following leg section i.e. the next smaller section, so that once the leg is extended to a desired overall length, it can be locked for supporting some weight without collapsing, and the telescoping sections together form a reasonably rigid support for the photographic device or other apparatus mounted to a tripod head. Each leg lock is associated with an outer leg section and an inner leg section. Two such leg locks are normally found in a typical three-section tripod leg.

One type of previously used leg lock includes a locking lever which is pivotally mounted by means of a bracket to the outer leg section and includes a cam element which, in a locking position of the lever, presses against the inner leg section through a window cut-out in the outer leg section, so that the inner section is pressed against an inner surface of the outer leg section opposite the window and the two leg sections are frictionally retained against further relative telescopic displacement. A pressure pad is normally disposed within the window opening between the cam element and the inner leg section for better distributing the cam pressure against the inner leg section.

This basic locking principle has been adopted in various forms and in different arrangements and configurations of the locking lever and the cam element.

A chief consideration in the design of this type of leg lock is the prevention of denting or deformation of the inner leg section, which is typically made of lightweight aluminum tubing for portability, under pressure of the locking lever. Since the aluminum tubing is not resilient, once deformed it may happen that the cam lever is no longer able to apply sufficient locking force at the deformed site and effective locking of the leg support is no longer possible. Other important considerations include the long term dependability of the cam element by avoiding deformation, wear or loss of elasticity of the cam element after many locking operations, so that cam pressure may be reliably and repeatedly applied to the inner leg section. Ease of operation of the locking lever is also important i.e. that relatively little force be required to move the lever into locking position or release the lever from this position.

The pressure pad is typically held captive within the window opening between the cam surface of the locking lever and the outer surface of the inner leg section. Because of the pivotal movement of locking lever it is necessary to accomodate some movement of the cam surface relative to the pressure pad, either by a resilient yielding of the pad, or to provide for cam-following-movement of the pad as the locking lever is pivoted between locking and released positions. This in turn places certain restrictions on the type of tubing which can be used for the leg sections. It is particularly desirable to provide for pivotal movement of the locking lever transverse to the leg sections, which is considerably more convenient from a user's stand point. This in turn dictates that the pressure pad must move with the cam surface against the surface of the inner leg section transversely to the leg axis. This calls for a smooth outer surface of the leg section as opposed to a longitudinally corrugated, reinforced leg section which is considerably stronger and more resistant to indentation or deformation under pressure of the locking lever.

Further improvement in such leg locking devices is therefore desirable to assure positive locking of the telescoping leg, easy lever action and dependable long term operation of the lock with a transversely pivoted lever.

SUMMARY OF THE INVENTION

The present invention addresses this continuing need by providing a telescopically extensible leg for a tripod support or the like, which includes at least one pair of outer and inner tubular leg sections telescopically slidable one within the other, each section having a six sided polygonal cross-section including an outer wall, two side walls each connected to the outer wall, an inner wall and two angled walls each connecting the inner wall to one of the side walls. A locking lever is mounted by means of a bracket on the outer section for pivotal movement transverse to the longitudinal dimension of the leg sections. A cam element on the locking lever is engageable in a locking position of the lever for applying locking force to one of the angled walls thereby to lock the pair of leg sections against relative movement. The cross section of the leg section tubing is dimensioned and configured such that locking force applied by the cam urges a corner of the inner section diagonally opposite to the cam into frictional engagement with a corresponding corner of the outer section. The polygonal cross section of the leg section tubing is further characterized in that the angled walls have a width substantially smaller than the outer wall of the corresponding section and the angled walls are angled at between approximately 45 to 65 degrees to the inner wall.

The cam element is preferably an eccentric cylindrical surface of the locking lever and locking force is applied by the cam surface through an intermediary pressure pad disposed in a window opening defined in an angled wall of the outer section, the pad having a planar undersurface in contact with an underlying angled wall of the inner section. The cylindrical cam surface is mateable in the locking position into a cam receiving recess in the pressure pad, and the window is dimensioned to allow cam following movement of the pad within the window. The inner wall is preferably approximately parallel to the outer wall, and the outer and inner walls may be substantially planar or somewhat convex.

A sleeve is interposed between the inner and outer tubular sections. The thickness of the sleeve varies between the various walls of the leg section tubing so as to preferentially direct the locking force against the corner opposite the window and away from the outer and side walls to avoid deformation of the larger-width walls of the tubing.

BRIEF DESCRIPTION OF THE DRAWINGS

FIG. 1 is a side elevational view of a typical photographic tripod improved according to present invention;

FIG. 2 is a longitudinal cross-section of a leg locking device according to this invention;

DETAILED DESCRIPTION OF THE PREFERRED EMBODIMENTS

Figure 3:
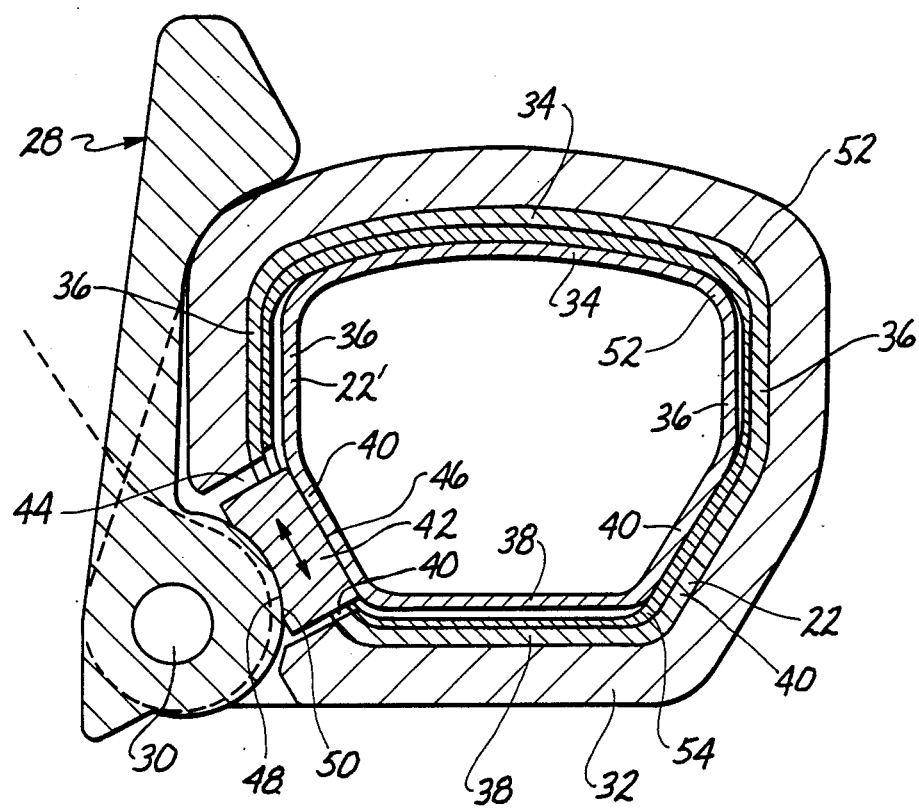
FIG. 3 is a transverse cross-section of the locking device taken along line 3—3 in FIG. 2.

FIG. 1 shows a typical tripod 10 for supporting photographic or video cameras which includes a head assembly 12 of conventional construction, and three tripod legs 14, only two legs being visible in the view of FIG. 1, the third leg being hidden behind a center tube 16 which contains a column with a rack geared to a pinion in the head 12. The pinion is turned by a crank 18 for elevating the camera attachment head 20 on the center column, as is conventional in such tripods.

Each tripod leg 14 includes three leg sections 22 which are of progressively diminishing cross-section and are telescopically slideable one into into the other. The uppermost leg section 22 which is of largest cross-sectional dimension is attached to the tripod head 12. The middle leg section 22' of intermediate cross sectional dimension is telescoped within leg section 22 and only a small portion thereof is visible in FIG. 1. The lower leg section 22'', of smallest cross-section dimension, is contained within the intermediate leg section 22', with its lower extremity encased in a rubber tip 24 and visible only in dotted lining. The relative telescopic extension of the three leg sections can be fixed by means of two leg locks 26 on each tripod leg 14.

Turning now to FIGS. 2 and 3, FIG. 2 shows in longitudinal cross-section one of the leg locks 26 mounted at the lower end of an outer leg section 22 for locking the telescopic extension of inner leg section 22' in one leg 14 of the tripod 10 in FIG. 1. The leg lock 26 includes a locking lever 28 pivoted on shaft 30 to a mounting bracket 32 which encompasses the outer periphery of the leg section 22, as shown in FIG. 3, and which is fixed to the lower end of this leg section as shown in FIG. 2. The locking lever 26 is pivotable in a plane transverse to the leg section 22 between a locking position shown in FIG. 3 and a released position suggested in dotted lining in FIG. 3. In FIG. 3, the cross-section of the outer and inner leg sections 22, 22', is seen to be polygonal and more specifically six-sided, each including an outer wall 34, two generally parallel side walls 36 each connected to the outer wall 34, an inner wall 38 and two angled walls 40 connecting the inner wall 38 to each of the side walls 36.

A brake or pressure pad 42 is disposed within a window opening 44 formed through the mounting bracket 32 and the outer leg section 22. The pad 42 is a generally rectangular element having a planar inner surface 46, and an outer surface in which is defined a cylindrical recess 48. The locking lever 28 has an integral cylindrical cam surface 50 which is eccentric to the cam shaft 30, so that in the illustrated locking position of the lever 28 the cam surface 50 seats into the pad recess 48 and operates to press the inner pad surface 46 against the angled wall 40 of the inner leg section 22' aligned with the window opening 44. The pressure applied by the pad 42 urges a diagonally opposite corner 52 of the inner leg section 22' into a corresponding corner 52 of the outer leg section 22.

A sleeve 54 of plastic or the like is interposed between the inner and outer leg sections 22, 22' and is itself fixed in position to the lower end of leg section 22 by means of a retaining flange 56 held between an inturned end 58 of the lever mounting bracket 32 and the end of the leg section 22 as seen in FIG. 2. The window opening 44 is defined through this sleeve 54 as well, as seen in FIG. 3. The cross-sectional wall thickness of the sleeve 54 varies along the sleeve circumference, and is thicker between the outer walls 34 and the angled walls 40 of the telescoped leg sections 22, 22', while the sleeve is thinner between the side walls 36 and inner walls 38 of the leg sections, all as seen in FIG. 3. The reduced sleeve thickness between the walls 36 in effect defines a wedge comprised of the outer walls 34 and the angled walls 40 which operates to direct the force applied through the pressure pad 42 generally towards the corners 52 of the two leg sections when camming force is applied to the pad 42 by the locking lever 28.

The dimension of the window 44 transverse to the leg sections 22, 22' is somewhat oversized to the similar dimension of the pressure pad 42 so as to allow lateral movement of the pad within the window as the pad follows the eccentric cam surface 50 when the lever 28 is moved between the locking and release positions. The pad movement is indicated by the arrow in FIG. 3 and it is transverse to the underlying wall 40 of the inner leg section 22'. The width of the angled walls 40 is substantially smaller than the width of outer wall 34 of the corresponding leg section. The walls 40 are angled at between approximately 60 and 45 degrees to the inner wall 38 of the corresponding leg section. The cam force applied by the locking lever and transmitted through the pressure pad 42 thus operates primarily against the angled wall 40 and corner 52 of the inner section 22'. Given that the width of the wall section 40 is relatively small and extends between two corners in the polygonal cross-sectional shape of the inner leg section, this angled wall 40 is relatively resistant to deformation under the locking force of the pressure pad 42. Likewise, the corner 52 of both the inner and outer leg sections are relatively strong, deformation resistant portions of the leg tubing.

The pressure pad 42 follows a simple, linear cam following path parallel to the outer surface of the pad bearing wall 40 of the inner leg section so that the pad 42 is not unduly deformed and does not suffer from excessive wear. Further, the inner leg section 22' is substantially immune to deformation under locking pressure of the lever 28 because of the polygonal cross-sectional geometry of the leg tubing and the selective application of locking forces, as has been described. The manual actuation of the locking lever 28 remains smooth with relatively low effort required.

The construction of all the leg locks 26 in the tripod 10 of FIG. 1 is similar to that described with reference to FIGS. 2 and 3, with suitable adjustment being made for the different cross-sectional dimensions of the various leg sections 22, 22' and 22''.

While a preferred embodiment of the improved tripod leg lock has been described and illustrated for purposes of clarity and explanation, it will be understood that many changes, substitutions and modifications to the described embodiment will become apparent to those possessed of ordinary skill in the art without thereby departing from the spirit and scope of the present invention which is defined by the following claims.

What is claimed is:

1. A telescopically extensible leg for a tripod support or the like, comprising:
   at least an outer and an inner tubular leg section telescopically slidable one within the other, each section having a six sided polygonal cross-section including an outer wall, two side walls each connected to said outer wall, an inner wall and two angled walls each connecting said inner wall to one of said side walls;
   a locking lever mounted on said outer section for pivotal movement transverse to said sections;
   cam means on said lever and positioned on one of said angled walls and engageable in a locking position of said lever for applying locking force diagonally to at least one of said angled walls thereby to lock said sections against relative movement.

2. The leg of claim 1 wherein said leg cross section is dimensioned and configured such that locking force urges a diagonally opposite corner of said inner section into frictional engagement with a corresponding corner of said outer section.

3. The leg of claim 1 wherein said polygonal cross section is characterized in that said angled walls have a width substantially smaller than said outer wall.

4. The leg of claim 1 wherein said angled walls are angled at between approximately 45 to 65 degrees to said inner wall.

5. The leg of claim 4 wherein said inner wall is approximately parallel to said outer wall.

6. The leg of claim 1 wherein said outer and inner walls are substantially planar.

7. The leg of claim 1 wherein said outer and inner walls are somewhat convex.

8. The leg of claim 1 wherein said cam means is an eccentric cylindrical surface of said lever.

9. The leg of claim 1 wherein said locking force is applied through an intermediary pressure pad disposed in a window opening in said outer section, said pad having a planar undersurface in contact with said one of said angled walls.

10. The leg of claim 9 wherein said cam means is an eccentric cylindrical surface of said lever and said cylindrical surface is mateable in said locking position into a cam receiving recess in said pad, said window being dimensioned to allow cam following movement of said pad therein.

11. The leg of claim 10 further comprising sleeve means between said inner and outer sections.

12. The leg of claim 11 wherein the thickness of said sleeve means differs between the various walls of the leg section tubing so as to preferentially direct said frictional engagement against said diagonally opposite and said corresponding corners and away from said outer and side walls.

13. A telescoping leg for a tripod support or the like, comprising:
   an outer and an inner tubular leg section telescopically slidable one within the other, each section having a six sided polygonal cross-section including an outer wall, two side walls each connected to said outer wall, an inner wall and two angled walls each connecting said inner wall to one of said side walls;
   a locking lever mounted on said outer section for pivotal movement transverse to said sections;
   cam means on said lever and positioned on one of said angled walls and engageable in a locking position of said lever against a pressure pad disposed in a window in said outer section thereby to frictionally lock said sections against relative movement;
   sleeve means positioned between said outer and inner tubular sections;
   said cross section being dimensioned and configured such that pad pressure in said locked position urges a diagonally opposite corner of said inner section into frictional engagement with a corresponding corner of said outer section; and
   said polygonal cross section characterized in that said angled walls have a width substantially smaller than said outer wall, said inner wall is approximately parallel to said outer wall and said angled walls are generally planar and angled at approximately 45 to 65 degrees to said inner wall.

14. The leg of claim 13 wherein said cam means is an eccentric cylindrical surface of said lever mateable in said locking position into a cam receiving recess in said pad, said pad has a planar undersurface in contact with said angled wall, and said window being dimensioned to allow cam following movement of said pad therein.

15. The leg of claim 13 wherein the thickness of said sleeve means differs at the various walls so as to preferentially direct said frictional engagement against said corresponding corner and towards said outer and angled wall opposite that contacted by said pad.

* * * * *